(12) United States Patent
Bolton et al.

(10) Patent No.: US 12,507,625 B2
(45) Date of Patent: Dec. 30, 2025

(54) COMBINE HARVESTERS HAVING LOUVERS TO ADJUST AIR FLOW, AND RELATED METHODS

(71) Applicant: AGCO Corporation, Duluth, GA (US)

(72) Inventors: Eric Wane Bolton, Buhler, KS (US); Tyler Gleason, Hesston, KS (US); Kye J Kurkowski, Hesston, KS (US); Brendan Meyer, Hesston, KS (US); Steve O'Halloran, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 811 days.

(21) Appl. No.: 17/757,814

(22) PCT Filed: Sep. 28, 2020

(86) PCT No.: PCT/IB2020/059045
§ 371 (c)(1),
(2) Date: Jun. 21, 2022

(87) PCT Pub. No.: WO2021/130559
PCT Pub. Date: Jul. 1, 2021

(65) Prior Publication Data
US 2023/0337581 A1 Oct. 26, 2023

Related U.S. Application Data

(60) Provisional application No. 62/954,061, filed on Dec. 27, 2019.

(51) Int. Cl.
*A01D 41/127* (2006.01)
*A01F 12/44* (2006.01)
(52) U.S. Cl.
CPC ........ *A01D 41/1276* (2013.01); *A01F 12/444* (2013.01)

(58) Field of Classification Search
CPC .. A01D 41/127; A01D 41/1276; A01D 75/28; A01D 75/282; A01F 12/44; A01F 12/444
See application file for complete search history.

(56) References Cited

U.S. PATENT DOCUMENTS

| 2,682,951 A | 7/1954 | Hamburg |
| 4,259,829 A | 4/1981 | Strubbe |

(Continued)

FOREIGN PATENT DOCUMENTS

| DE | 289559 C | 3/1914 |
| DE | 2853700 A1 | 7/1980 |

(Continued)

OTHER PUBLICATIONS

T.Stahl & T. Freye, Automatic Control of Cleaning Fan Speed to Reduce Sidehill Losses; Dec. 15-18, 1981; 14 pages; Paper No. 81-1617; Palmer House, Chicago, Illinois.

(Continued)

*Primary Examiner* — Joseph M Rocca
*Assistant Examiner* — Robert E Pezzuto

(57) ABSTRACT

A combine harvester having a cleaning shoe includes a housing, a chaffer having a frame assembly and a plurality of first louvers rotatably mounted to the frame assembly, and a blower comprising a plurality of second louvers. The first louvers are configured to rotate about lateral axes thereof, the lateral axes perpendicular to a longitudinal axis of the combine harvester. The second louvers are configured to change a lateral direction of air flow from the blower to the chaffer. Another combine harvester has a plurality of second louvers below first louvers of a chaffer. Each of the second louvers are configured to rotate about an axis perpendicular to the lateral axes of the first louvers of the chaffer. A method of operating a combine includes rotating at least one second (Continued)

louver to change a direction of the air flow in the cleaning shoe before the air flow reaches the chaffer.

16 Claims, 8 Drawing Sheets

(56) References Cited

U.S. PATENT DOCUMENTS

| | | | |
|---|---|---|---|
| 4,875,889 | A | 10/1989 | Hagerer et al. |
| 6,203,580 | B1 | 3/2001 | Vandenbossche et al. |
| 8,821,229 | B2 * | 9/2014 | Stan .................. A01D 41/1276 460/99 |
| 10,314,237 | B2 * | 6/2019 | Missotten ............. A01F 12/448 |
| 2019/0104687 | A1 * | 4/2019 | Thomas ................ A01F 12/444 |

FOREIGN PATENT DOCUMENTS

| | | |
|---|---|---|
| DE | 3230965 A1 | 4/1984 |
| EP | 2476304 A1 | 7/2012 |
| GB | 2472639 A1 | 2/2011 |

OTHER PUBLICATIONS

James Monroe Hershbarger, Development and Modeling of a Slope Insensitive Combine Cleaning Shoe; 2008; 79 Pages; UMI No. 1457580; ProQuest LLC, Ann Arbor, MI.

UK Intellectual Property Office, Search report for related UK Application No. GB2000688.8 dated Jul. 17, 2020.

European Patent Office, International Search Report related to International Patent Application No. PCT/IB2020/059045, mail date Dec. 8, 2020.

* cited by examiner

COMBINE HARVESTERS HAVING LOUVERS TO ADJUST AIR FLOW, AND RELATED METHODS

CROSS-REFERENCE TO RELATED APPLICATION

This application claims the benefit of the filing date of U.S. Provisional Patent Application 62/954,061, "Combine Harvesters Having First Louvers and Second Louvers, and Related Methods," filed Dec. 27, 2019, the entire disclosure of which is incorporated herein by reference.

FIELD

Embodiments of the present disclosure relate to combine harvesters. More particularly, embodiments of the present disclosure relate to apparatuses and methods for adjusting air flow through a chaffer.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard tank. Straw and crop residue is ejected from the rear of the combine harvester in the field.

Transverse threshing combine harvesters have a threshing cylinder that rotates on a transverse axis and threshes a harvested crop stream. Grain and chaff separated in this process falls due to gravity through a grate onto an underlying thresher pan, which is driven in an oscillating manner to convey the grain and chaff rearward to a rear edge, where the grain and chaff falls into a cleaning unit. The remainder of the crop stream from the threshing process is conveyed rearward from the threshing cylinder into a separating apparatus, which may include a plurality of straw walkers or one or more axial rotors. During the separating process, further grain and chaff is removed from the straw and falls through a grate onto a separator pan that is also driven in an oscillating manner to convey the grain and chaff forward to a front edge, where it falls by gravity into the cleaning unit. The straw by-product from the separating apparatus is ejected from the rear of the combine.

The cleaning unit of most combines operates according to a well-established process in which grain and chaff (also referred to in the art as material other than grain (MOG)) cascading down from the thresher and separator pans is subjected to an airstream created by one or more fans. A chaffer has a frame that supports a series of louvers, which are positioned to allow grain to fall downward through the chaffer while allowing a flow of cleaning air to pass upward and rearward through the chaffer. The cleaning air flow tends to force MOG rearward and restricts MOG from falling through the chaffer. The heavier grain falls through the chaffer and optionally through another cleaning sieve below before being conveyed to the grain tank.

The speed of the airflow through the chaffer may be selected to balance various operational parameters for agronomic benefit, such as percentage of chaff removed from the crop stream, percentage of grain lost from the rear of the machine, mass throughput, and fuel usage.

Cleaning units in combine harvesters are described in more detail in, for example, U.S. Pat. No. 9,426,943, "Combine Harvester Grain Cleaning Apparatus," issued Aug. 30, 2016; U.S. Patent Application Publication 2014/0128133, "Harvester Having Chaffer with Tillable Section," published May 8, 2014; and U.S. Pat. No. 5,624,315, "Cleaning Means for an Agricultural Harvesting Machine," issued Apr. 29, 1997.

BRIEF SUMMARY

A combine harvester has a longitudinal axis extending from a forward end to a rearward end thereof. The combine harvester includes a cleaning shoe. The cleaning shoe includes a housing, a chaffer having a frame assembly and a plurality of first louvers rotatably mounted to the frame assembly, and a blower comprising a plurality of second louvers. At least one sensor is configured to measure an orientation of the combine harvester, an air flow through the chaffer, and/or a solid material flow through the chaffer. The first louvers are configured to rotate about lateral axes thereof, the lateral axes perpendicular to the longitudinal axis of the combine harvester. The second louvers are configured to change a lateral direction of air flow from the blower to the chaffer responsive to the property measured by the at least one sensor.

A combine harvester has a longitudinal axis extending from a forward end to a rearward end thereof. The combine harvester includes a cleaning shoe. The cleaning shoe includes a housing, a chaffer having a frame assembly and a plurality of first louvers rotatably mounted to the frame assembly, a plurality of second louvers below the first louvers within the housing, and a blower configured to provide air flow through the housing between the second louvers and through the chaffer. The first louvers are configured to rotate about lateral axes thereof, the lateral axes perpendicular to the longitudinal axis of the combine harvester. Each of the second louvers are configured to rotate about an axis perpendicular to the lateral axes of the chaffer.

A method of operating a combine harvester having a cleaning shoe having a blower and a chaffer with a plurality of first louvers includes rotating at least one second louver to change a direction of an air flow in the cleaning shoe before the air flow reaches the chaffer.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments when read in conjunction with the accompanying drawings, in which:

DETAILED DESCRIPTION

Figure 1:
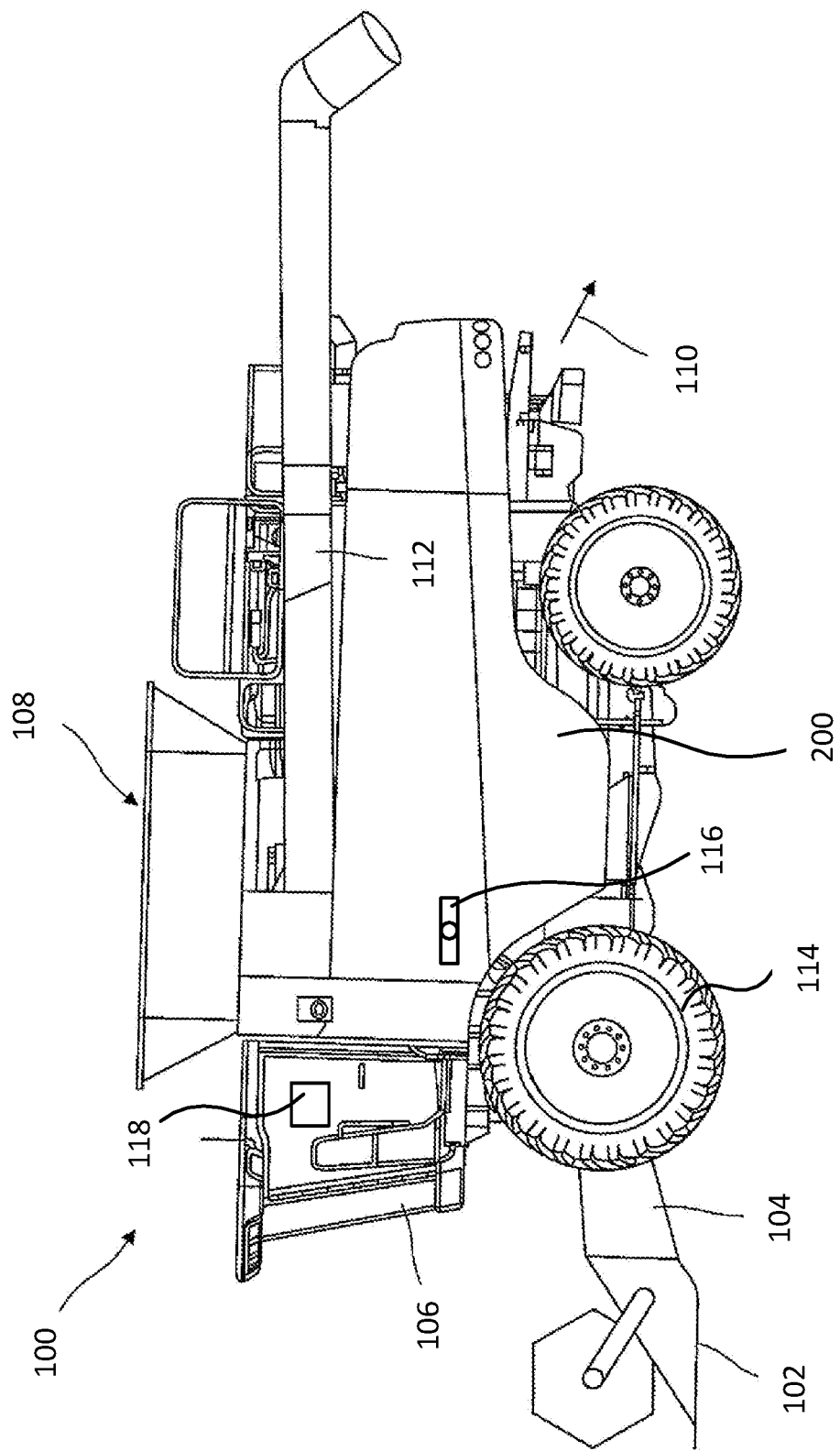
FIG. 1 is a simplified side view of a combine harvester.

The illustrations presented herein are not actual views of any combine harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

From reading the following description it should be understood that the terms longitudinal and transverse are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft, wherein axial relates to a direction along the rotation axis and radial equates to a direction perpendicular to the rotation axis.

With reference to FIG. 1, a self-propelled combine harvester 100 carries a header 102 that cuts and gathers a strip of crop as the combine harvester 100 is driven across a crop field. An elevator section 104 conveys the cut crop stream from the header 102 into a crop processing apparatus 200 in the combine harvester 100, described in more detail below. Clean grain separated from the crop stream is collected in a storage tank 108, which is periodically emptied into a trailer or other vehicle or storage container via an unloading auger 112. Residue material remaining from the crop stream, such as straw and chaff, is ejected from the rear of the combine harvester 100, represented by arrow 110. The combine harvester 100 also typically includes an operator cab 106, an engine, and wheels 114 and/or tracks. In some embodiments, the combine harvester 100 may include a sensor 116 configured to measure the orientation of the combine harvester 100 with respect to gravity (i.e., to determine whether the combine harvester 100 is on a slope). In other embodiments, the sensor 116 may be an inertial sensor. The sensor 116 may be electrically connected to a controller 118, typically located in the operator cab 106.

Figure 2:
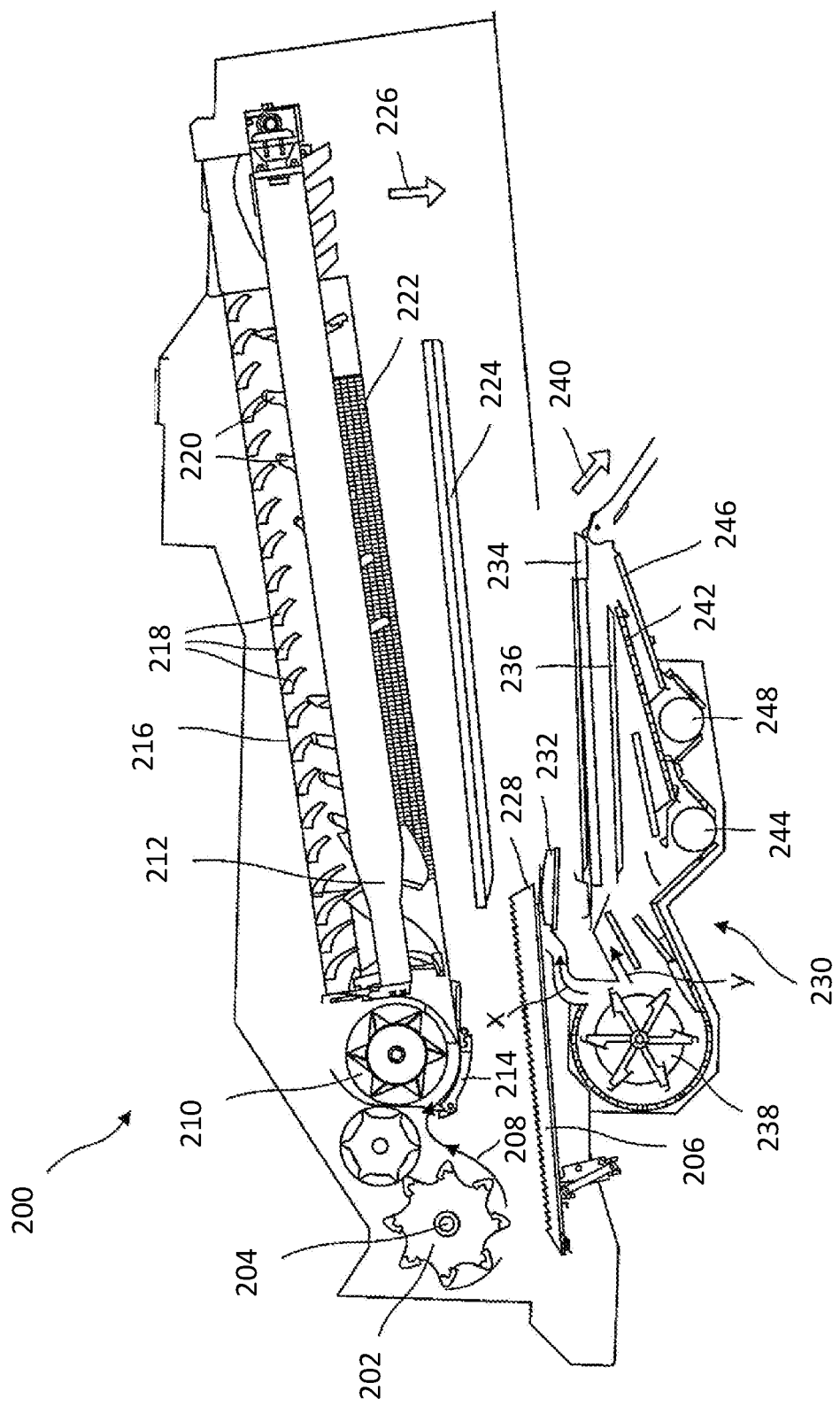
FIG. 2 is a simplified side view of a crop processing apparatus that may be used in the combine harvester of FIG. 1.

Turning to the details of the crop processing apparatus 200, as shown in FIG. 2, the crop stream passes from the elevator section 104 into a threshing unit having a transverse threshing cylinder 202 that rotates around a transverse axis 204. As in known combines, the crop stream is threshed between the threshing cylinder 202 and a concaved surface (not shown). Grain and chaff separated in this process falls through a grate in the concave onto an underlying thresher pan 206, forming a primary grain/chaff stream. The residue straw is conveyed rearward as represented by arrow 208 from the threshing unit to a transverse transfer beater 210. From here, the crop stream is typically divided into two sub-streams and passed into respective longitudinally-aligned separating rotor 212(s). It will be appreciated that only one separating rotor 212 is shown in FIG. 2, with the other separating rotor 212 being hidden from view. The transfer beater 210 has associated therewith a concave grate 214 through which further grain and chaff may fall under gravity onto the underlying thresher pan 206.

Each separating rotor 212 has associated therewith a substantially cylindrical cage 216 within which the separating rotor 212 rotates. Upon the inside upper peripheral surface of the rotor cage 216(s), a plurality of guide vanes 218 are mounted for cooperation with fingers 220 of the separating rotor 212, which together further separate grain from straw. The lower portion of each cage 216 has a grate 222 formed therein, which allows separated grain and chaff to fall by gravity onto an underlying separator pan 224, forming a secondary grain/chaff stream.

The residue straw is ejected from the crop processing apparatus 200 at the rear of the separating rotor 212(s), as indicated by arrow 226.

Although the above described crop processing apparatus 200 includes a threshing cylinder 202 and transverse transfer beater 210 followed by a pair of longitudinal separating rotor 212(s) operating on an axial separation principle (which may be referred to in the art as a "hybrid" processing system), different processing apparatus may be used in some embodiments. For example, the separating rotor 212(s) may be replaced with straw walkers, as described in U.S. Pat. No. 7,877,969, "Method for Adjusting a Working Unit of a Harvesting Machine," granted Feb. 1, 2011. In other embodiments, the threshing cylinder 202 and transverse transfer beater 210 may be replaced by a feed cylinder, and threshing may be caused by the rotors 212, as described in U.S. Pat. No. 9,629,310, "Grain Separating Apparatus in a Combine Harvester," granted Apr. 25, 2017. In still other embodiments, the crop processing apparatus 200 may include one or more transverse rotors, as described in U.S. Pat. No. 9,345,197, "Combine Harvester with Even Crop Distribution," granted May 24, 2016.

Both the thresher pan 206 and separator pan 224 are driven in an oscillating manner to convey grain and chaff streams rearward and forward respectively. The drive mechanism for the thresher pan 206 and separator pan 224 is conventional and is not described in detail herein.

In some embodiments, a stream of grain and chaff is transferred from a rear edge 228 of the thresher pan 206 to a cleaning shoe 230. The grain and chaff may initially fall onto a cascade pan 232 before falling from the rear edge 228 onto a chaffer 234 in the cleaning shoe 230. In other embodiments, various mechanisms may be used to convey the stream of grain and chaff to the cleaning shoe 230, which mechanisms are generally known in the art and not described in detail herein.

One or more blowers 238 generate a cleaning airstream, a portion of which is directed rearward between the thresher pan 206 and cascade pan 232 as represented by arrow X. The lighter chaff may be blown rearward and carried by the airstream out of the rear of the crop processing apparatus 200 as represented by arrow 240, while the heavier grain falls onto the cascade pan 232, and then onto the chaffer 234. Another airstream, represented by arrow Y, is directed rearward between the chaffer 234 and a sieve 236. The airstream(s) from the blower(s) 238 may be directed along any selected path. For example, the blower(s) may provide a single airstream to the chaffer 234. Again, the cascading motion of the grain and chaff allows the airstream Y to convey additional chaff toward the rear of the cleaning shoe 230. The chaffer 234 is coarser (having larger openings) than the sieve 236, which is located under the chaffer 234. The chaffer 234 and sieve 236 may also be referred to in the art as an upper sieve and lower sieve, respectively, because they may be of generally the same construction.

The chaffer 234 and the sieve 236 are generally driven forward and aft in an oscillating manner. Straw and material too large to pass through chaffer 234 is conveyed rearward by the oscillating motion and air from the blower(s) 238 before falling from the rear edge and out of the rear of the crop processing apparatus 200, as indicated by arrow 240. Tailings, or unthreshed grain, and grain passes through the chaffer 234 onto the sieve 236. Grain falls through sieve 236 onto an underlying collection pan 242, which directs the clean grain to a transverse delivery auger 244 for delivering the grain to the storage tank 108 (FIG. 1). The tailings that cannot pass through the holes in the sieve 236 are conveyed rearward by the oscillating motion and air from the blower(s) 238 before falling from the rear edge of the sieve 236 onto a tailings collection pan 246, which delivers the tailings to a rethreshing delivery system 248, which may include, for example, an auger, a blower, and/or a conveyor.

Figure 3:
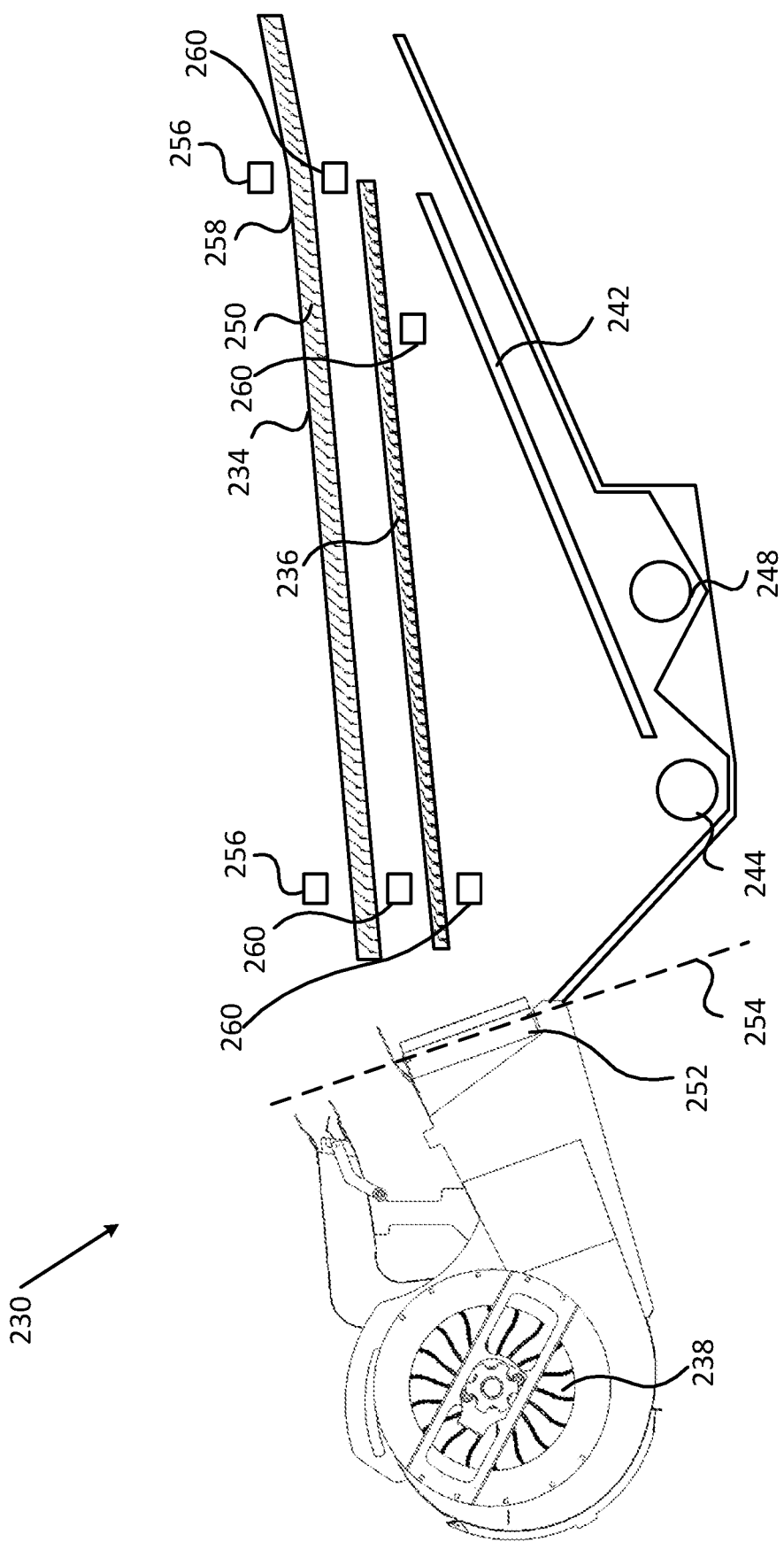
FIG. 3 is a simplified side view of a cleaning shoe of the crop processing apparatus of FIG. 2.
Figure 4:
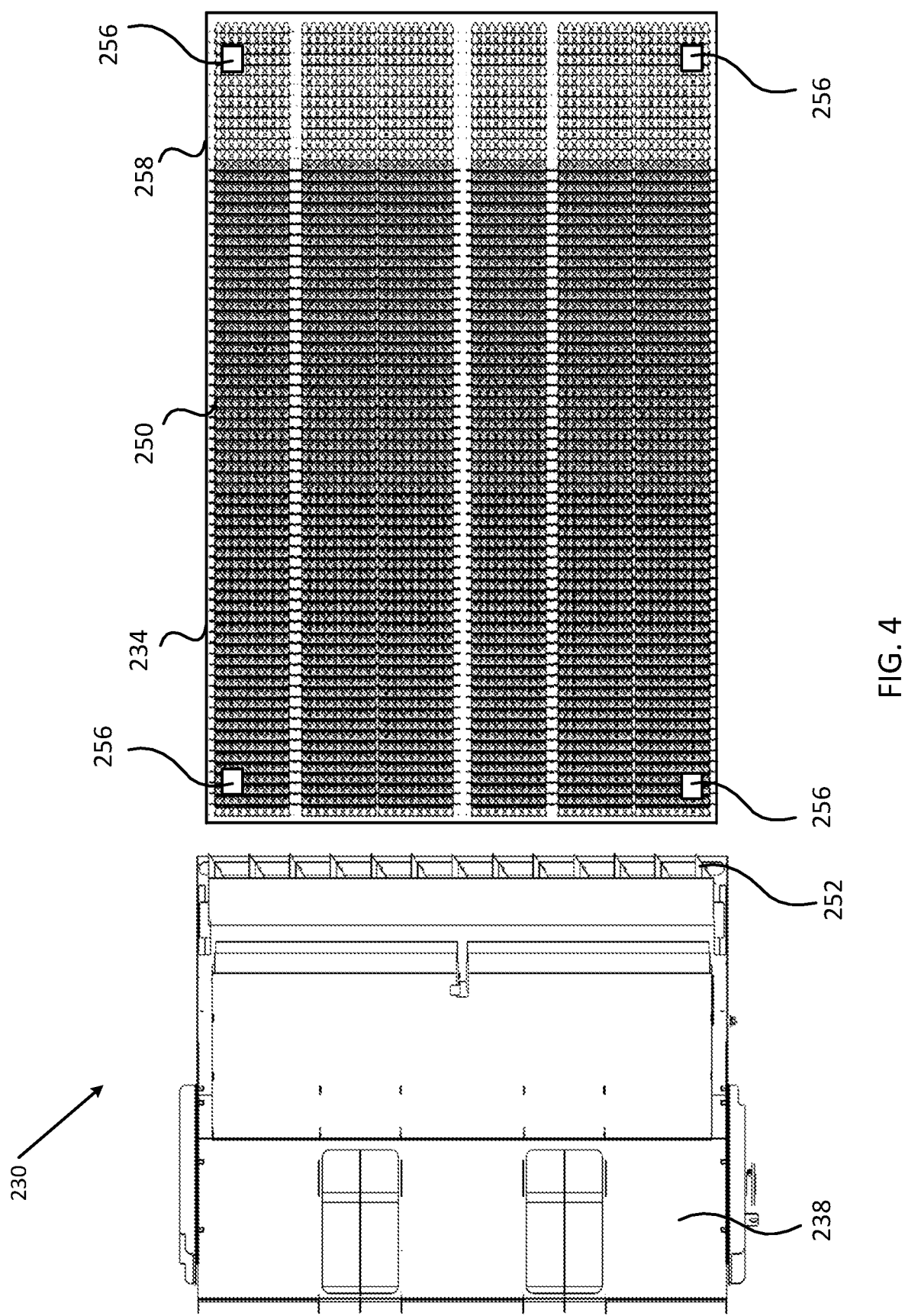
FIG. 4 is a simplified top view of the cleaning shoe shown in FIG. 3.

FIG. 3 is a simplified side view of the cleaning shoe 230 showing more details thereof. FIG. 4 is a simplified top view of the cleaning shoe 230. The chaffer 234 may include a plurality of first louvers 250 rotatably mounted to a frame assembly 258. Each of the first louvers 250 may rotate about lateral axes thereof (i.e., side-to-side, perpendicular to a longitudinal axis of the combine harvester 100) to change the size of openings in the chaffer 234. The sieve 236 may be of similar construction, and the louvers of the sieve 236 are typically adjusted such that the openings in the sieve 236 are smaller than the openings in the chaffer 234.

A plurality of second louvers 252 may be configured to change the lateral direction of air flow from the blower(s) 238 to the chaffer 234. That is, each of the second louvers 252 may rotate generally along an axis 254, into and out of the page, in the view shown in FIG. 3. For example, the axes 254 may be inclined about 5° to about 30° from vertical when the combine harvester 100 is on level ground. In other embodiments, the axes 254 may be approximately vertical. When the second louvers 252 are in a neutral orientation (i.e., directing air neither left nor right), the second louvers 252 may be parallel to one another and to the longitudinal axis of the combine harvester 100. The second louvers 252 may be controlled by one or more actuators, such as linear actuators, rotary actuators, etc.

The second louvers 252, when moved from a neutral orientation, may direct air into or out of the page in the view shown in FIG. 3, and toward the top or bottom of the page in the view shown in FIG. 4. Therefore, one side of the chaffer 234 may have relatively more air flow than another side. In some embodiments, the direction of air by the second louvers 252 may help maintain approximately equal air flow on each side of the chaffer 234, in conditions in which the air flow would have been unequal absent the second louvers 252 (e.g., when a slope or other conditions causes material to concentrate on one side or another).

Figure 5:
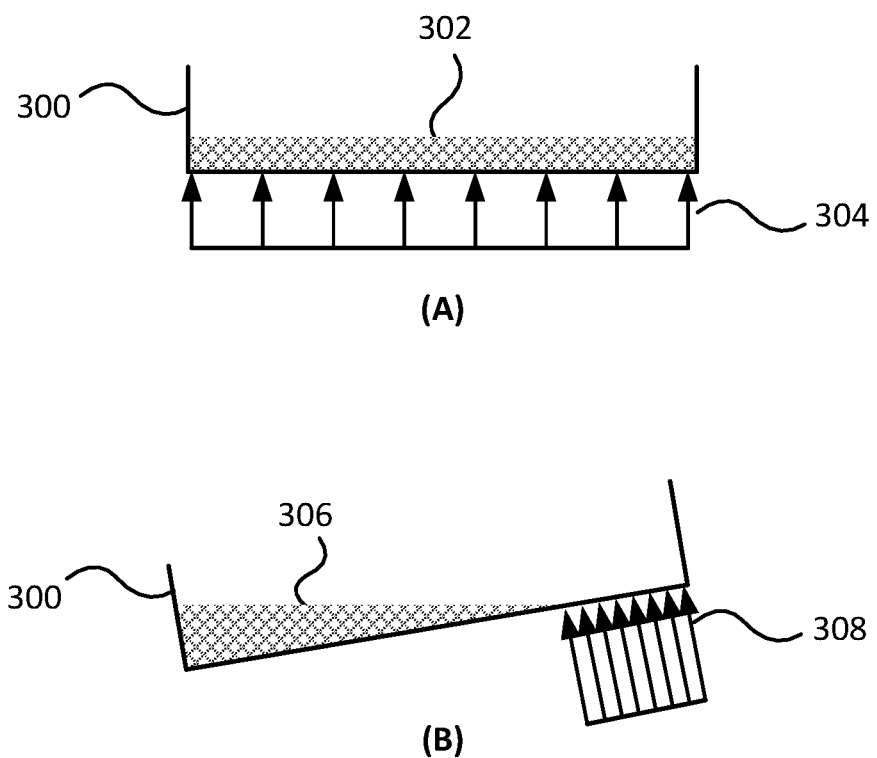
FIGS. 5A & B are cross-sectional views illustrating a conventional chaffer of a combine harvester in different positions.

Investigations of combine harvester cleaning systems have found that when a combine harvester is operated on ground that is not level, the crop material may not be spread uniformly across the width of the chaffer and sieve. Furthermore, other conditions, such as uneven crop growth across the harvesting width, or passing a part of the header 102 over a portion of a field that was previously harvested, may cause an uneven distribution of crop material across the chaffer and the sieve. Because separation of the crop material on the chaffer and sieve relies in part on aerodynamics (and also on mechanical motion of the chaffer and sieve), uniform air flow through the material is desirable. However, uneven distribution of the crop material can cause air from the blower to flow generally around the crop material. FIG. 5 is a cross-sectional view illustrating a conventional chaffer 300 of a combine harvester operated on level ground (A) and on a side hill (B), in which one lateral side of the combine harvester is higher than the other. As shown, when the combine harvester is level, the crop material 302 is of approximately uniform depth across the chaffer 300, and air flow 304 is of approximately uniform velocity upward through the crop material 302. When the combine harvester is on a side slope, crop material 306 tends to gather toward one side, leaving part of the chaffer 300 free of crop material 306 or with a relatively thinner layer of the crop material 306. Because air flows through its path of least resistance, air flow 308 in the tilted chaffer 300 is through the portion of the chaffer 300 having little or no crop material 306. Thus, the separation of the grain from the chaff in the chaffer 300 in this orientation may be based solely or primarily on mechanics, rather than on the combination of mechanics plus aerodynamics. Thus the chaffer 300 may not achieve acceptable separation of grain from chaff when operated on hills or in other areas where crop is not uniformly distributed. This problem and other potential solutions are discussed in Hershberger, James Monroe, "Development and modeling of a slope insensitive combine cleaning shoe," Iowa State University Capstones, Theses and Dissertations, 15423 (2008) (available at https://lib.dr.iastate.edu/rtd/15423).

Figure 6:
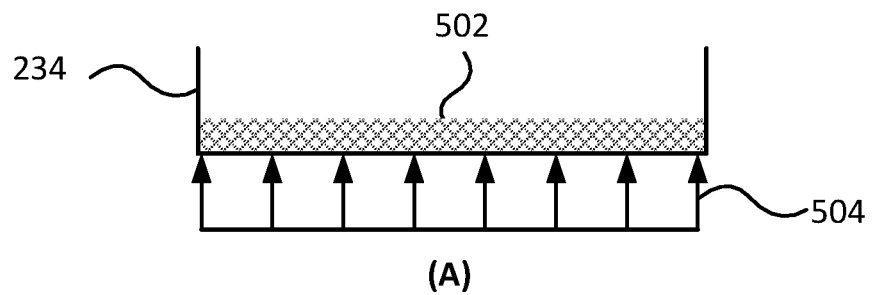
FIGS. 6A-D are cross-sectional views illustrating a chaffer of a combine harvester in different positions, such as from the cleaning shoe shown in FIGS. 3 and 4.
Figure 6:
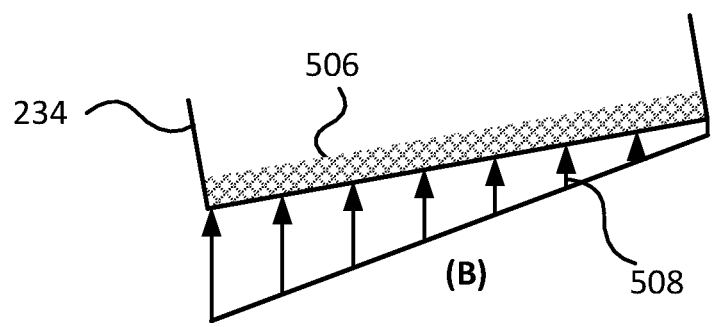
Figure 6:
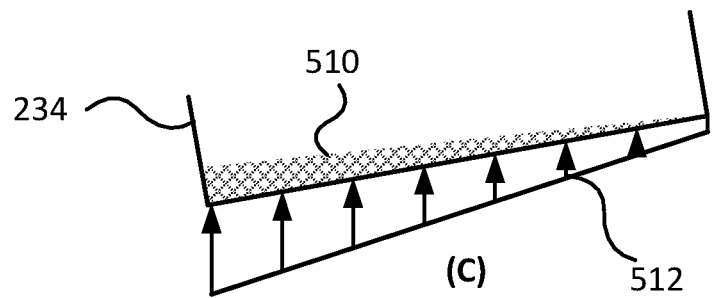
Figure 6:
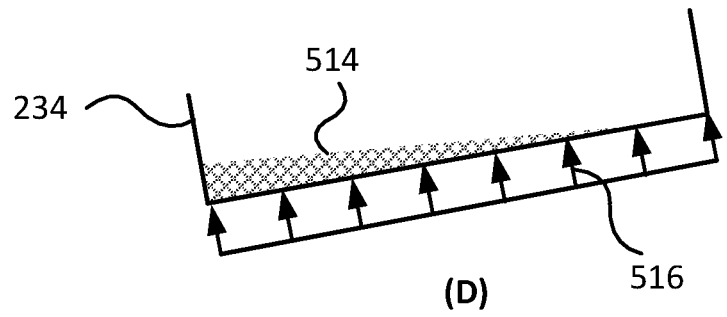

To avoid this problem, the crop processing apparatus 200 described herein and shown in FIGS. 2-4 may direct air toward portions of the chaffer 234 having more crop material thereon. FIG. 6 is a cross-sectional view illustrating the chaffer 234 operated on level ground (A) and on a side hill (B), (C), and (D), in which one lateral side of the combine harvester carrying the chaffer 234 is higher than the other. As shown, when the combine harvester is level, the crop material 502 is of approximately uniform depth across the chaffer 234, and air flow 504 is of approximately uniform velocity upward through the crop material 502 (similar to the situation shown in FIG. 5(A)). When the combine harvester is on a side slope, crop material 506 may still be spread across the width of the chaffer 234 as shown in FIG. 5(B) because air flow 508 is not uniform across the width of the chaffer 234. That is, control of the second louvers 252 may redirect the air flow 508 to assist in keeping the crop material 506 approximately uniformly distributed across the chaffer 234, so that separation of grain from chaff can occur with approximately the same efficiency across the chaffer 234. Thus, the chaffer 234 may achieve improved separation of grain from chaff when operated on hills or in other areas where crop material would not otherwise be uniformly distributed across the chaffer 234, as compared to a conventional chaffer 300. In some embodiments as shown in FIG. 6(C), the crop material 510 may tend to gather toward one side of the chaffer 234, but the air flow 512 may be concentrated at that side of the chaffer 234. In other embodiments as shown in FIG. 6(D), the crop material 514 may tend to gather toward one side of the chaffer 234, but the air flow 516 may be evenly distributed across the chaffer 234. One combine harvester 100 may encounter the situations depicted in FIG. 6(A) through 6(D) under different operating conditions.

Though described above in terms of one side of the chaffer 234 and another, the second louvers 252 may operate to redirect the air flow 508 to spread the crop material 506 across distinct sections of the chaffer 234. Furthermore, the second louvers 252 may be individually adjusted to spread the crop material 506 as needed to improve separation. The rate of the air flow 508 may be higher (indicated by longer arrows) at the side of the chaffer 234 that is lower. As shown, the air flow 508 may be generally upward (i.e., in a direction opposite the force of gravity), even when the chaffer 234 is not level. In other embodiments, the air flow 508 may be generally perpendicular to the chaffer 234, but still varied across the width of the chaffer 234.

Figure 7:
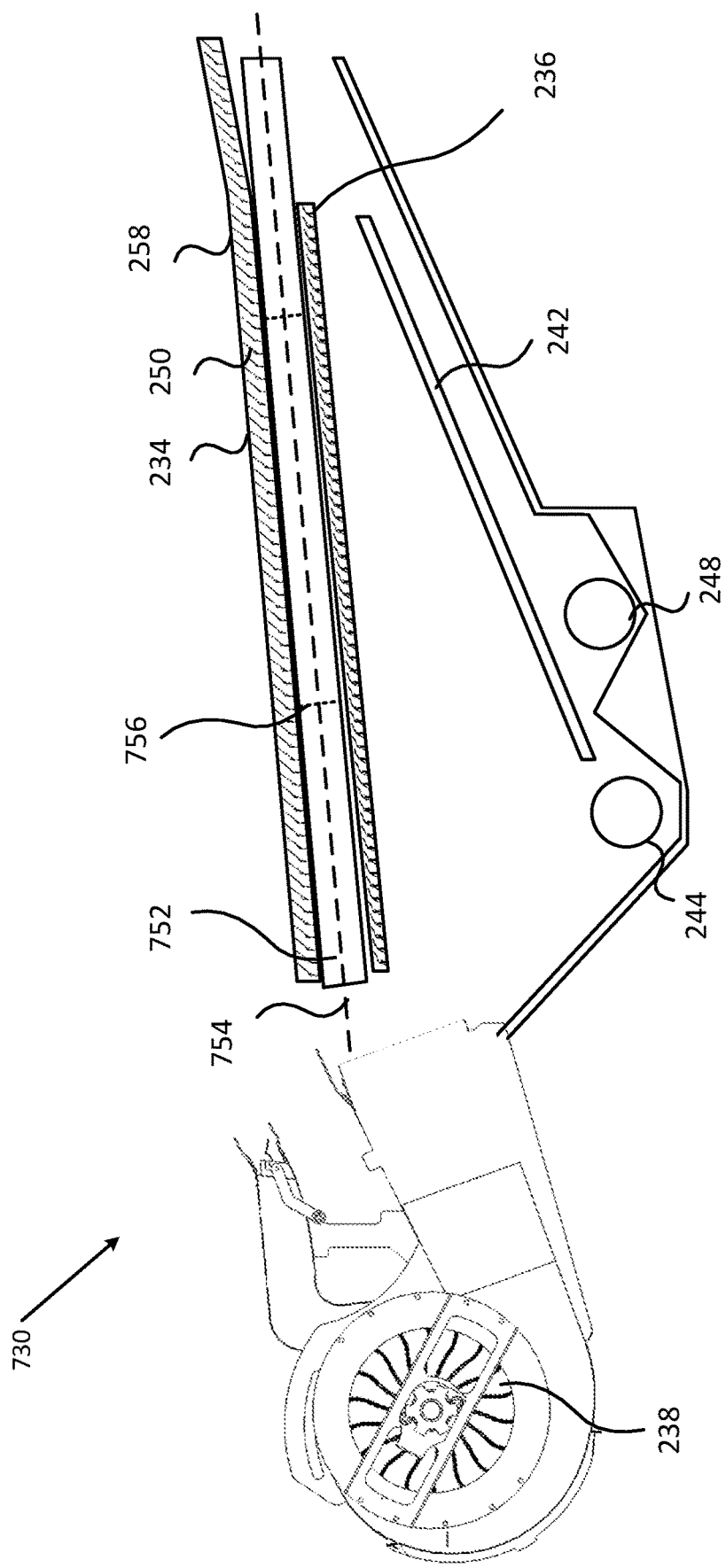
FIG. 7 is a simplified side view of a cleaning shoe of another crop processing apparatus.

In other embodiments, and as shown in a cleaning shoe 730 depicted in FIG. 7, second louvers 752 may be in other locations to direct the air flow through the chaffer 234. For example, the second louvers 752 may be underneath the first louvers 250 and oriented perpendicular to the first louvers 250. That is, in the orientation shown in FIG. 7, the second louvers 752 may rotate generally along an axis 754, into and out of the page (whereas, in the orientation shown in FIG. 7, the first louvers 250 of the chaffer 234 rotate clockwise and counterclockwise in the plane of the page). Thus, the second louvers 752 may direct air into or out of the page in the view shown in FIG. 7. The second louvers 752 may each be adjustable independent of one another to direct air flow. In some embodiments, the second louvers 752 may each extend approximately the entire length of the chaffer 234. In other embodiments, the second louvers 752 may each be split into two or more independent sections sharing a common axis of rotation (with separations between adjacent sections indicated by dashed lines 756) to provide additional options to direct air where needed in the chaffer 234. In other embodiments, the second louvers 752 may extend less than the entire length of the chaffer 234 (e.g., approximately one-third, one-half, or two-thirds the length of the chaffer 234).

The controller 118 (FIG. 1) may control the position of the second louvers 252, 752 based on the orientation of the combine harvester 100 with respect to gravity (e.g., as determined by the sensor 116). For example, the second louvers 252, 752 may be controlled by actuators. In some embodiments, the cleaning shoe 230 may have other sensors 256 (FIGS. 3 and 4) and/or 260 (FIG. 3) configured to measure, for example, air flow or solid material flow at various points in the cleaning shoe 230. For example, the sensors 256 may include piezoelectric sensors configured to measure pressure. The sensors 260 may include acoustical sensors, optical sensors, or any other sensors configured to detect crop material. The controller 118 may adjust the second louvers 252, 752 to achieve a selected distribution of air flow or material within the cleaning shoe 230 (e.g., to provide approximately uniform air flow across the chaffer 234, to provide approximately uniform crop depth across the chaffer 234, etc.). The adjustments may be made based on information from the sensors 116 and/or 256, information from a field map, information from other vehicles, and/or operator inputs. For example, the controller 118 may use information from the sensor 116 to determine the current orientation of the combine harvester 100 and to predict how the material will flow through the cleaning shoe 230 in response to that orientation. The controller 118 may use information from the sensors 256, 260 to determine the current location of material within the cleaning shoe 230 separate from the orientation of the combine harvester 100. Information from the different types of sensors 116, 256, 260 may enable the controller 118 to adjust to current flow conditions and future flow conditions, potentially providing a faster response and better control of flow than a controller using only one type of sensor.

Figure 8:
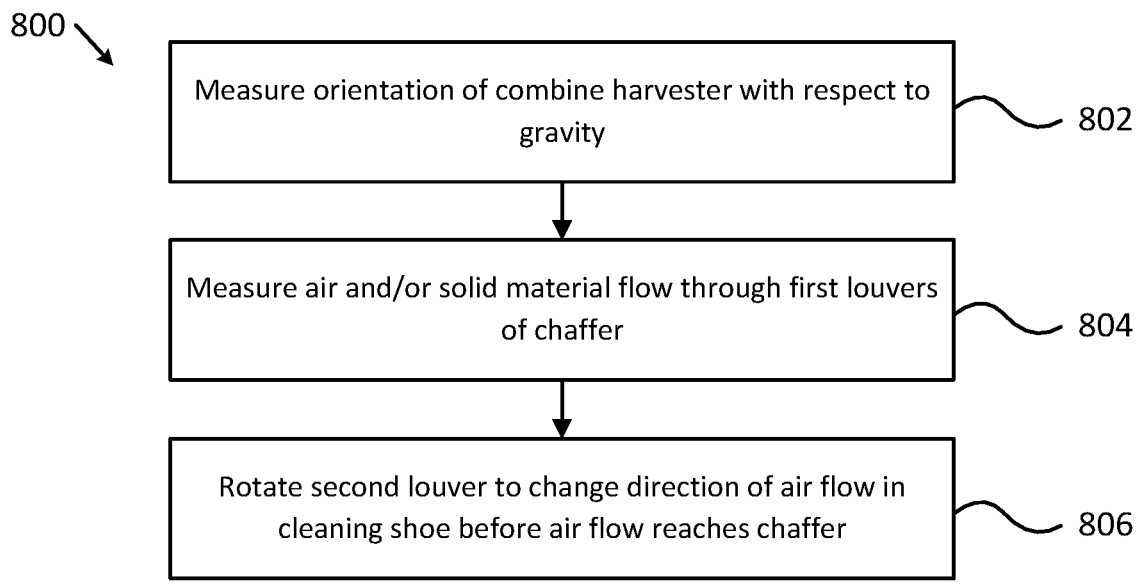
FIG. 8 is a simplified flow chart illustrating a method of using a combine harvester to harvest a crop in an agricultural field.

FIG. 8 is a simplified flow chart illustrating a method 800 of using the combine harvester 100 to harvest a crop in an agricultural field. In block 802, an orientation of the combine harvester 100 with respect to gravity is measured, such as with the sensor 116. In block 804, air flow and/or solid material flow is measured through the first louvers 250 of the chaffer 234. In block 806, at least one of the second louvers 252, 752 is rotated to change the direction of air flow in the cleaning shoe 230 before the air reaches the chaffer 234. The second louvers 252, 752 may be rotated responsive to the measured air or solid material flow rate. In some embodiments, individual second louvers 252 or 752 may be rotated such that they are not parallel to one another.

Figure 9:
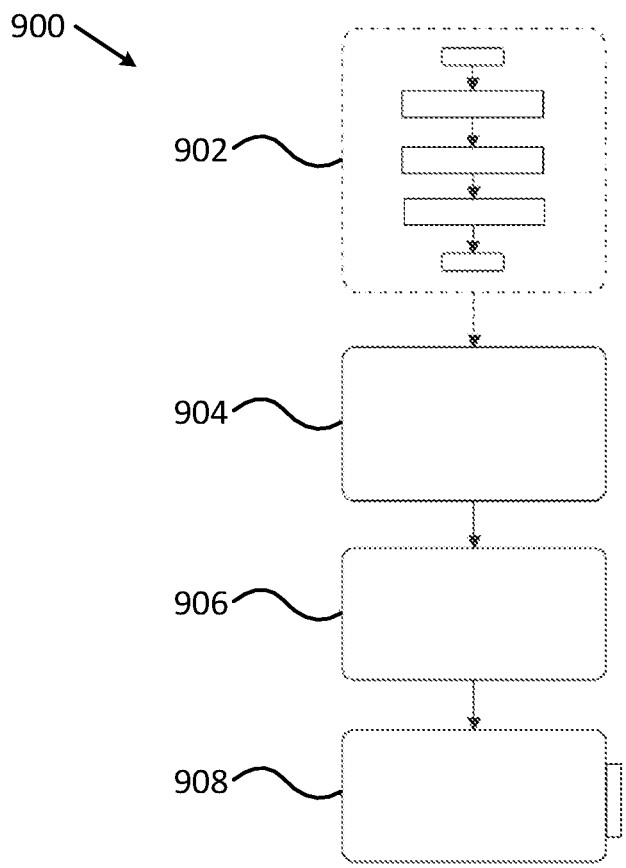
FIG. 9 illustrates an example computer-readable storage medium comprising processor-executable instructions configured to embody one or more of the methods of working an agricultural field, such as the method illustrated in FIG. 8.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 9, wherein an implementation 900 includes a computer-readable storage medium 902 (e.g., a flash drive, CD-R, DVD-R, application-specific integrated circuit (ASIC), field-programmable gate array (FPGA), a platter of a hard disk drive, etc.), on which is computer-readable data 904. This computer-readable data 904 in turn includes a set of processor-executable instructions 906 configured to operate according to one or more of the principles set forth herein. In some embodiments, the processor-executable instructions 906 may be configured to cause a computer associated with the combine harvester 100 (FIG. 1) to perform operations 908 when executed via a processing unit, such as at least some of the example method 800 depicted in FIG. 8. In other embodiments, the processor-executable instructions 906 may be configured to implement a system, such as at least some of the example combine harvester 100 depicted in FIG. 1. Many such computer-readable media may be devised by those of ordinary skill in the art that are configured to operate in accordance with one or more of the techniques presented herein.

Additional non-limiting example embodiments of the disclosure are described below.

Embodiment 1: A combine harvester having a longitudinal axis extending from a forward end to a rearward end thereof. The combine harvester comprises a cleaning shoe. The cleaning shoe comprises a housing, a chaffer having a frame assembly and a plurality of first louvers rotatably mounted to the frame assembly, and a blower comprising a plurality of second louvers. At least one sensor is configured to measure a property selected from the group consisting of an orientation of the combine harvester, an air flow through the chaffer, and a solid material flow through the chaffer. The first louvers are configured to rotate about lateral axes thereof, the lateral axes perpendicular to the longitudinal axis of the combine harvester. The second louvers are configured to change a lateral direction of air flow from the blower to the chaffer responsive to the property measured by the at least one sensor.

Embodiment 2: The combine harvester of Embodiment 1, wherein the second louvers are each configured to rotate about axes spaced outward from the longitudinal axis of the combine harvester.

Embodiment 3: The combine harvester of Embodiment 1 or Embodiment 2, wherein the second louvers are each configured to rotate about axes inclined from about 5° to about 30° from vertical when the combine harvester is on level ground.

Embodiment 4: The combine harvester of any one of Embodiment 1 through Embodiment 3, wherein when the second louvers are each in a neutral orientation, the second louvers are parallel to one another and to the longitudinal axis of the combine harvester.

Embodiment 5: The combine harvester of any one of Embodiment 1 through Embodiment 4, wherein the plurality of second louvers are independently adjustable to direct air flow.

Embodiment 6: The combine harvester of any one of Embodiment 1 through Embodiment 5, wherein the at least one sensor is configured to detect an orientation of the combine harvester with respect to gravity.

Embodiment 7: The combine harvester of any one of Embodiment 1 through Embodiment 6, wherein the at least one sensor is configured to detect air or solid material flow through the chaffer.

Embodiment 8: The combine harvester of any one of Embodiment 1 through Embodiment 7, further comprising a controller configured to adjust each second louver to control air flow through the chaffer.

Embodiment 9: A combine harvester having a longitudinal axis extending from a forward end to a rearward end thereof. The combine harvester comprises a cleaning shoe. The cleaning shoe comprises a housing, a chaffer having a frame assembly and a plurality of first louvers rotatably mounted to the frame assembly, a plurality of second louvers below the first louvers within the housing, and a blower configured to provide air flow through the housing between the second louvers and through the chaffer. The first louvers are configured to rotate about lateral axes thereof, the lateral axes perpendicular to the longitudinal axis of the combine harvester. Each of the second louvers are configured to rotate about an axis perpendicular to the lateral axes of the chaffer.

Embodiment 10: The combine harvester of Embodiment 9, wherein each of the second louvers extends an entire length of the chaffer.

Embodiment 11: The combine harvester of Embodiment 9, wherein each of the second louvers extends less than an entire length of the chaffer.

Embodiment 12: The combine harvester of any one of Embodiment 9 through Embodiment 11, wherein each of the second louvers comprises at least two independent sections sharing a common axis of rotation, each section extending less than an entire length of the chaffer.

Embodiment 13: The combine harvester of any one of Embodiment 9 through Embodiment 12, further comprising a controller configured to adjust each second louver to control air flow through the chaffer.

Embodiment 14: The combine harvester of Embodiment 13, further comprising at least one sensor configured to measure a property selected from the group consisting of an orientation of the combine harvester, an air flow through the chaffer, and a solid material flow through the chaffer, wherein the controller is configured to adjust each second louver responsive to the property measured by the at least one sensor.

Embodiment 15: The combine harvester of any one of Embodiment 9 through Embodiment 14, wherein the second louvers are each configured to rotate about axes spaced outward from the longitudinal axis of the combine harvester.

Embodiment 16: The combine harvester of any one of any one of Embodiment 9 through Embodiment 15, wherein when the second louvers are each in a neutral orientation, the second louvers are parallel to one another and to the longitudinal axis of the combine harvester.

Embodiment 17: The combine harvester of any one of Embodiment 9 through Embodiment 16, wherein the plurality of second louvers are independently adjustable to direct air flow.

Embodiment 18: The combine harvester of any one of Embodiment 14 through Embodiment 17, wherein the at least one sensor is configured to detect an orientation of the combine harvester with respect to gravity.

Embodiment 19: The combine harvester of any one of Embodiment 14 through Embodiment 18, wherein the at least one sensor is configured to detect the air flow through the chaffer or the solid material flow through the chaffer.

Embodiment 20: A method of operating a combine harvester having a cleaning shoe comprising a blower and a chaffer comprising a plurality of first louvers, the method comprising rotating at least one second louver to change a direction of an air flow in the cleaning shoe before the air flow reaches the chaffer.

Embodiment 21: The method of Embodiment 20, further comprising measuring an orientation of the combine harvester with respect to gravity.

Embodiment 22: The method of Embodiment 20 or Embodiment 21, further comprising measuring the air flow or a solid material flow through the plurality of first louvers.

Embodiment 23: The method of Embodiment 22, wherein rotating at least one second louver comprises rotating the at least one second louver responsive to the measured air flow or solid material flow through the plurality of first louvers.

Embodiment 24: The method of any one of Embodiment 20 through Embodiment 23, wherein rotating at least one second louver comprises rotating at least one second louver located directly below the chaffer.

Embodiment 25: The method of any one of Embodiment 20 through Embodiment 24, wherein rotating at least one second louver comprises rotating at least one second louver coupled to a housing containing the blower.

Embodiment 26: The method of any one of Embodiment 20 through Embodiment 25, wherein rotating at least one second louver comprises orienting two second louvers to be non-parallel to one another.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A combine harvester having a longitudinal axis extending from a forward end to a rearward end thereof, the combine harvester comprising:
   a cleaning shoe comprising:
      a housing;
      a chaffer having a frame assembly and a plurality of first louvers rotatably mounted to the frame assembly, wherein the first louvers are configured to rotate about lateral axes thereof, the lateral axes perpendicular to the longitudinal axis of the combine harvester;
      at least one sensor configured to measure a property selected from the group consisting of an orientation of the combine harvester, an air flow through the chaffer, and a solid material flow through the chaffer; and
      a blower comprising a plurality of second louvers, the second louvers located directly below the chaffer and configured to change a lateral direction of air flow from the blower to the chaffer responsive to the property measured by the at least one sensor, wherein when the second louvers are each in a neutral orientation, the second louvers are parallel to one another and to the longitudinal axis of the combine harvester.

2. The combine harvester of claim 1, wherein the second louvers are each configured to rotate about second louver axes spaced outward from the longitudinal axis of the combine harvester.

3. The combine harvester of claim 1, wherein the second louvers are each configured to rotate about second louver axes inclined from about 5° to about 30° from vertical when the combine harvester is on level ground.

4. The combine harvester of claim 1, wherein the plurality of second louvers are independently adjustable to direct air flow.

5. The combine harvester of claim 1, wherein the at least one sensor is configured to detect an orientation of the combine harvester with respect to gravity.

6. The combine harvester of claim 1, wherein the at least one sensor is configured to detect air or solid material flow through the chaffer.

7. The combine harvester of claim 1, further comprising a controller configured to adjust each said second louver to control air flow through the chaffer.

8. A combine harvester having a longitudinal axis extending from a forward end to a rearward end thereof, the combine harvester comprising:
   a cleaning shoe comprising:
      a housing;
      a chaffer having a frame assembly and a plurality of first louvers rotatably mounted to the frame assembly, wherein the first louvers are configured to rotate about lateral axes thereof, the lateral axes perpendicular to the longitudinal axis of the combine harvester;
      a plurality of second louvers below the first louvers within the housing, each of the second louvers located directly below the chaffer and configured to rotate about an axis perpendicular to the lateral axes of the chaffer, wherein each of the second louvers comprises at least two independent sections sharing a common axis of rotation, each section extending less than an entire length of the chaffer; and
      a blower configured to provide air flow through the housing between the second louvers and through the chaffer.

9. The combine harvester of claim 8, wherein each of the second louvers extends an entire length of the chaffer.

10. The combine harvester of claim 8, wherein each of the second louvers extends less than an entire length of the chaffer.

11. The combine harvester of claim 8, further comprising a controller configured to adjust each said second louver to control air flow through the chaffer.

12. The combine harvester of claim 11, further comprising at least one sensor configured to measure a property selected from the group consisting of an orientation of the combine harvester, an air flow through the chaffer, and a solid material flow through the chaffer, wherein the controller is configured to adjust each second louver responsive to the property measured by the at least one sensor.

13. A method of operating a combine harvester having a cleaning shoe comprising a blower and a chaffer comprising a plurality of first louvers, the method comprising:

measuring an orientation of the combine harvester with respect to gravity;

rotating at least one second louver located directly below the chaffer to change a direction of an air flow in the cleaning shoe before the air flow reaches the chaffer in response to the measured orientation of the combine harvester.

14. The method of claim 13, further comprising measuring the air flow or a solid material flow through the plurality of first louvers.

15. The method of claim 14, wherein rotating at least one second louver comprises rotating the at least one second louver responsive to the measured air flow or solid material flow through the plurality of first louvers.

16. The method of claim 13, wherein rotating at least one second louver comprises orienting two second louvers to be non-parallel to one another.

\* \* \* \* \*